Aug. 29, 1933.　　　L. H. BLOOD ET AL　　　1,924,594
COMBINED AUTOMATIC MACHINE TOOL
Filed Jan. 15, 1931　　　9 Sheets-Sheet 1

Inventor
LOUIS H. BLOOD
CHARLES W. GOODRICH
By H. K. Parsons
Attorney

Aug. 29, 1933.    L. H. BLOOD ET AL    1,924,594
COMBINED AUTOMATIC MACHINE TOOL
Filed Jan. 15, 1931    9 Sheets-Sheet 2

Inventor
LOUIS H. BLOOD
CHARLES W. GOODRICH
By O. H. K. Parsons
Attorney

Aug. 29, 1933.  L. H. BLOOD ET AL  1,924,594
COMBINED AUTOMATIC MACHINE TOOL
Filed Jan. 15, 1931    9 Sheets-Sheet 4

Inventor
LOUIS H. BLOOD
CHARLES W. GOODRICH
By AHKParsons
Attorney

Aug. 29, 1933.   L. H. BLOOD ET AL   1,924,594
COMBINED AUTOMATIC MACHINE TOOL
Filed Jan. 15, 1931   9 Sheets-Sheet 5
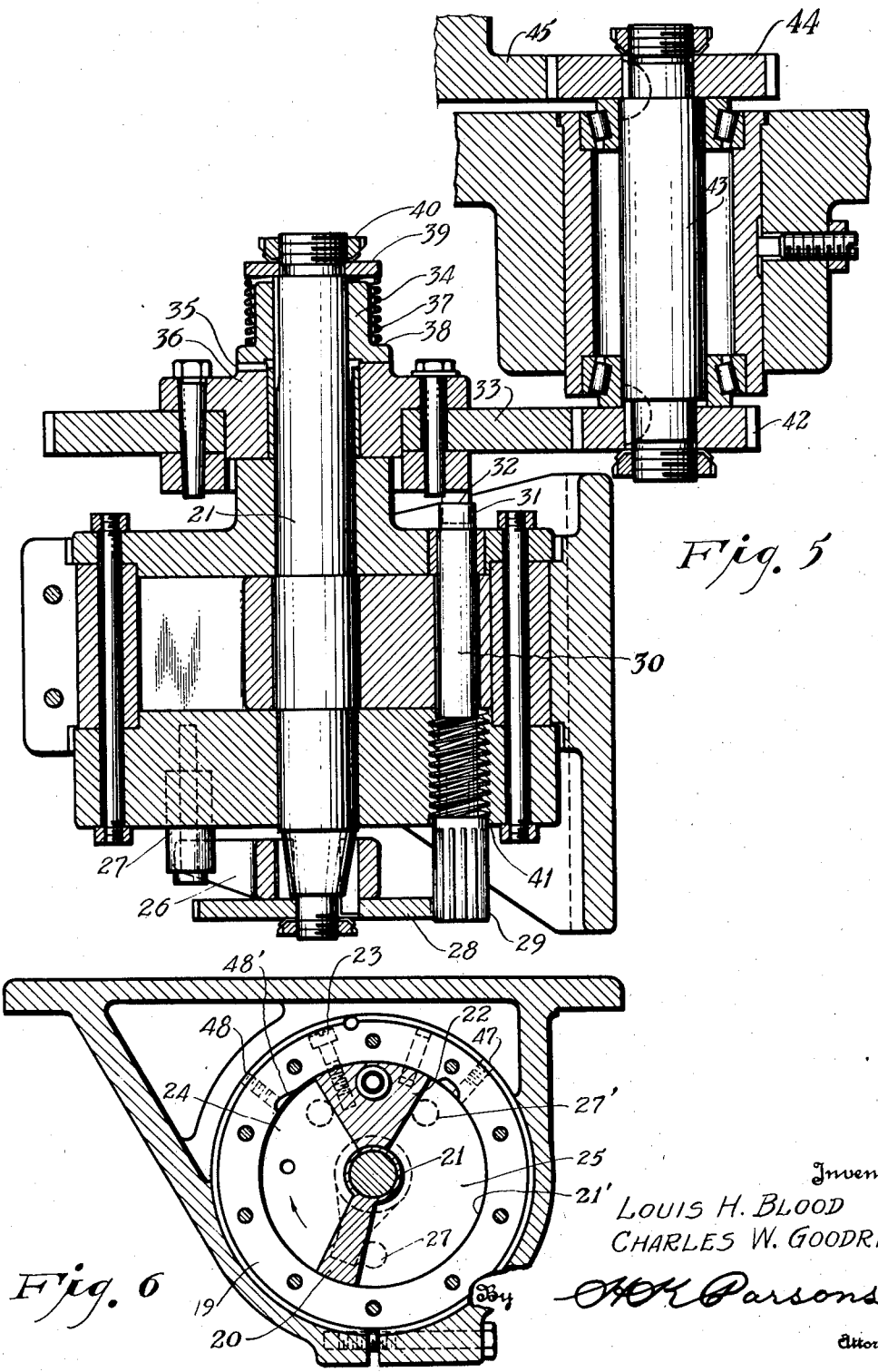
Inventor
LOUIS H. BLOOD
CHARLES W. GOODRICH

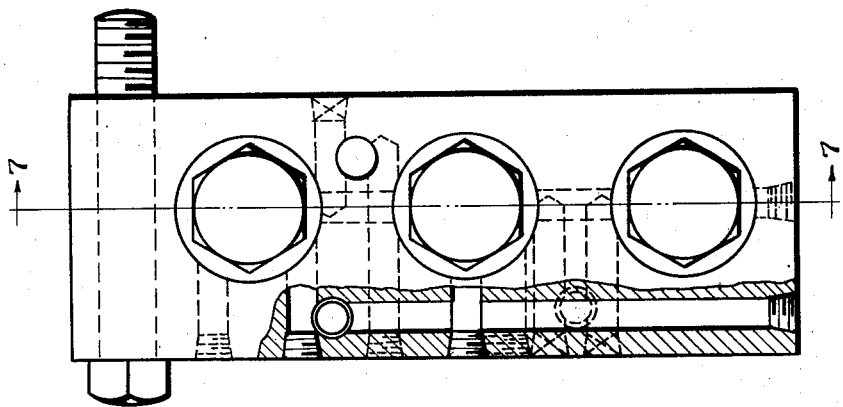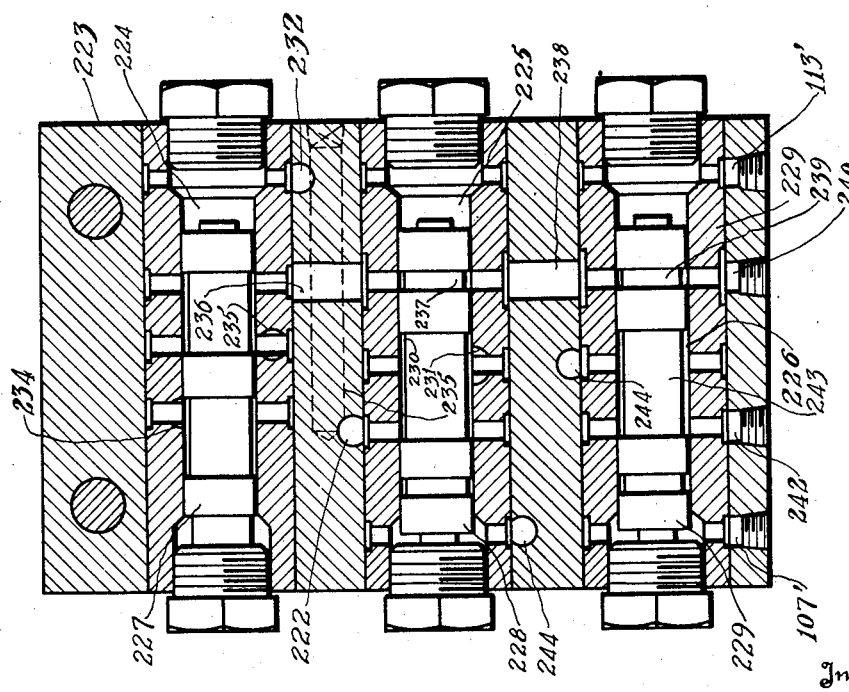

Louis H. Blood
Charles W. Goodrich

Aug. 29, 1933.  L. H. BLOOD ET AL  1,924,594
COMBINED AUTOMATIC MACHINE TOOL
Filed Jan. 15, 1931  9 Sheets-Sheet 8

Inventor
LOUIS H. BLOOD
CHARLES W. GOODRICH

By *AHKParsons*

Attorney

Aug. 29, 1933.   L. H. BLOOD ET AL   1,924,594
COMBINED AUTOMATIC MACHINE TOOL
Filed Jan. 15, 1931   9 Sheets-Sheet 9
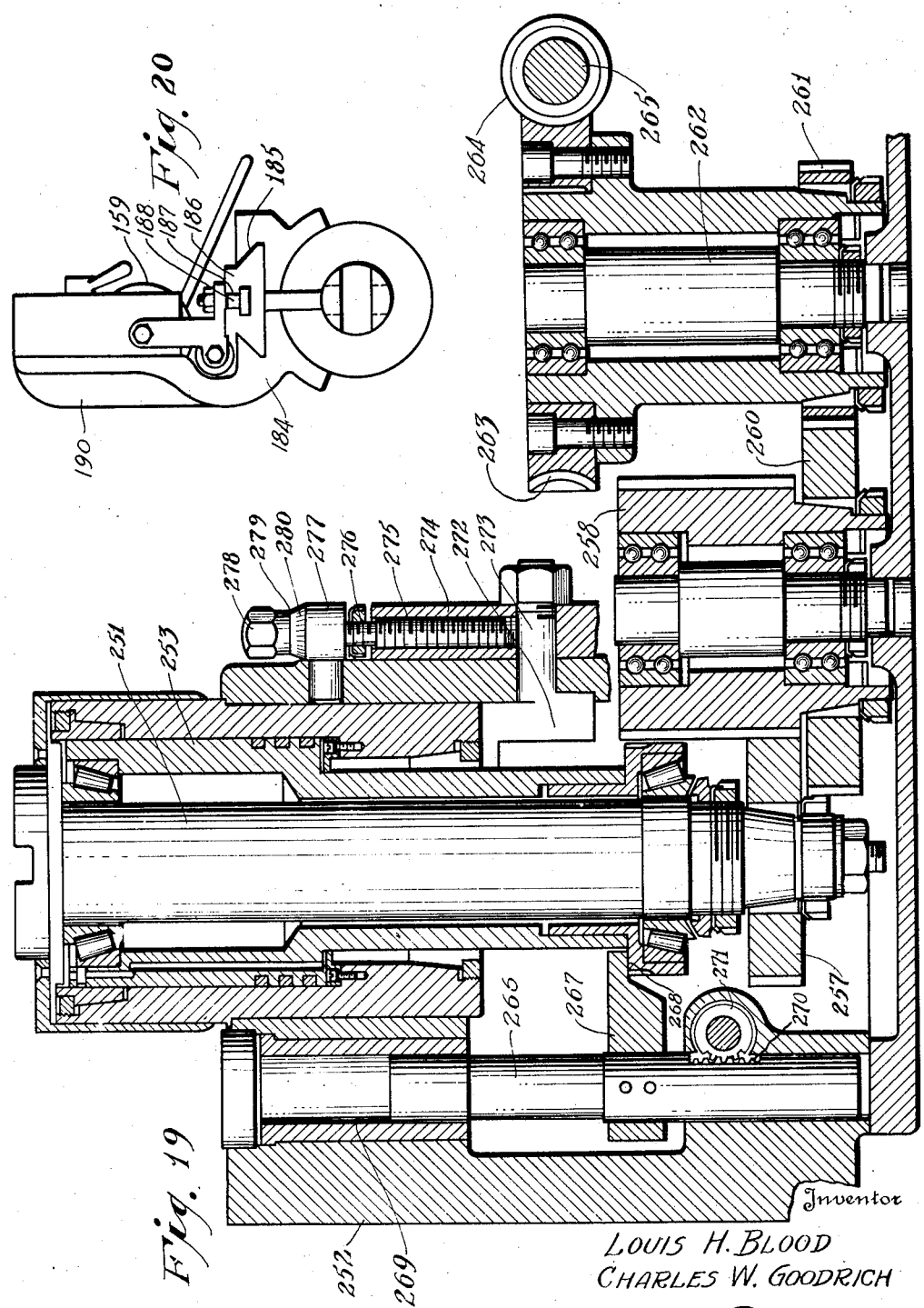
Inventor
LOUIS H. BLOOD
CHARLES W. GOODRICH
By Parsons
Attorney Patented Aug. 29, 1933

1,924,594

UNITED STATES PATENT OFFICE 1,924,594

COMBINED AUTOMATIC MACHINE TOOL

Louis H. Blood and Charles W. Goodrich, Cincinnati, Ohio, assignors to The Cincinnati Milling Machine Company, Cincinnati, Ohio, a corporation of Ohio Application January 15, 1931. Serial No. 508,991

24 Claims. (Cl. 29—38)

This invention relates to machine tools and more particularly to an improved combined machine of the station type.

One of the principal objects of this invention is to provide an improved automatic machine tool of the station type in which the work is mounted for indexing from station to station in such a manner that machining operations may be performed upon any one or all of three sides of the work thereby presenting the maximum number of planes in which tooling operations may be effected during one set-up of the work.

Another important object of this invention is the provision of an improved hydraulically actuated machine of the station type in which all of the translating and indexing movements are effected by hydraulically actuated means whereby improved automatic control means may be utilized resulting in a more flexible and efficient machine.

A further object of this invention is the provision of an hydraulically actuated index table with improved means for floating the table during the indexing operation together with improved clamping mechanism therefor.

A still further object of this invention is the provision of improved control means for a plurality of independently operated tool heads cooperating with work on a common index table of a station type machine whereby initiation of the next indexing movement is determined by the return of the last tool head to its starting position.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts.

Figure 5 is an expanded view of the turret indexing mechanism.

Figure 6 is a section through the indexing motor.

Figure 7 is a sectional view of the indexing control valve as seen from line 7—7 of Figure 8.

Figure 8 is an end elevation of the indexing control valve.

Figure 9 is an elevation of a tool head reciprocating and control unit.

Figures 12 to 16 inclusive, are diagrammatic views of a series of machining operations that may be performed on the machine of this invention.

Figures 12, 13, 14, 15, 16:
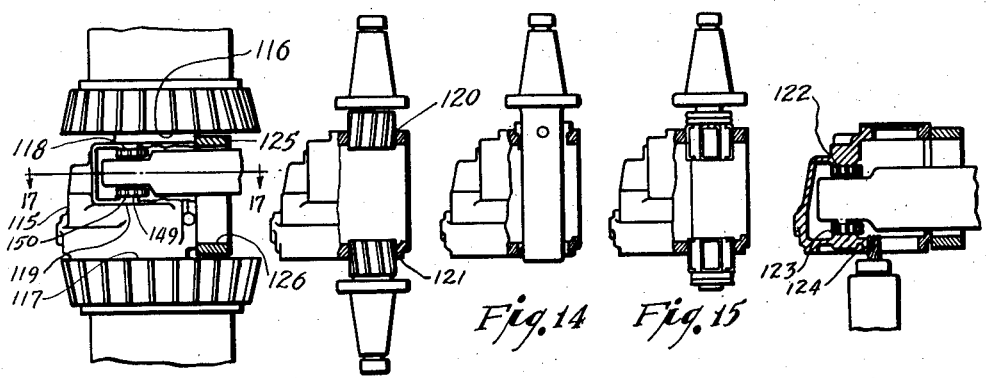
Figure 17:
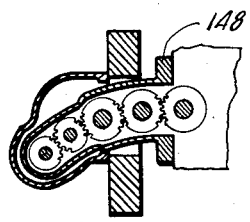

Figure 17 is a section on the line 17—17 of Figure 12.

Figure 18:
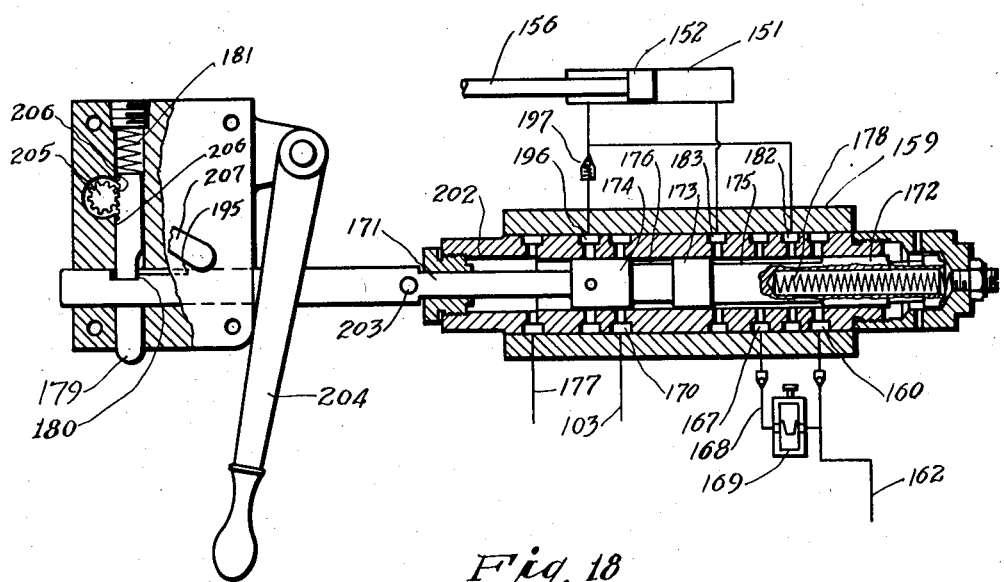

Figure 18 is a detail section of a tool head feed control valve.

Figure 19 is an expanded view of a modified type of reciprocable tool head.

Figure 20 is an end view of the tool head operating and control unit shown in Figure 9.

Figure 1:
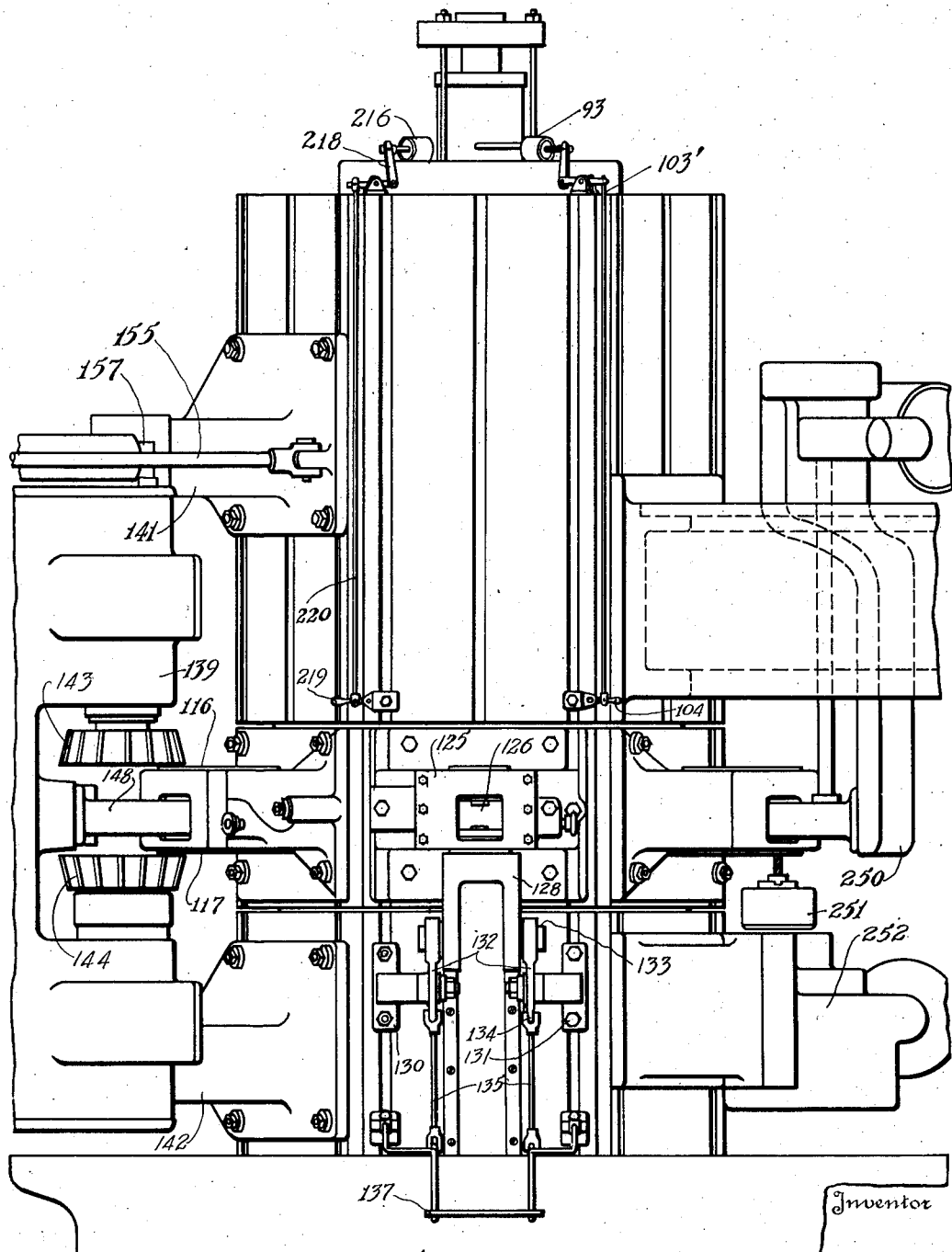
Figure 1 is a front elevation of a machine embodying the principles of this invention.
Figure 3:
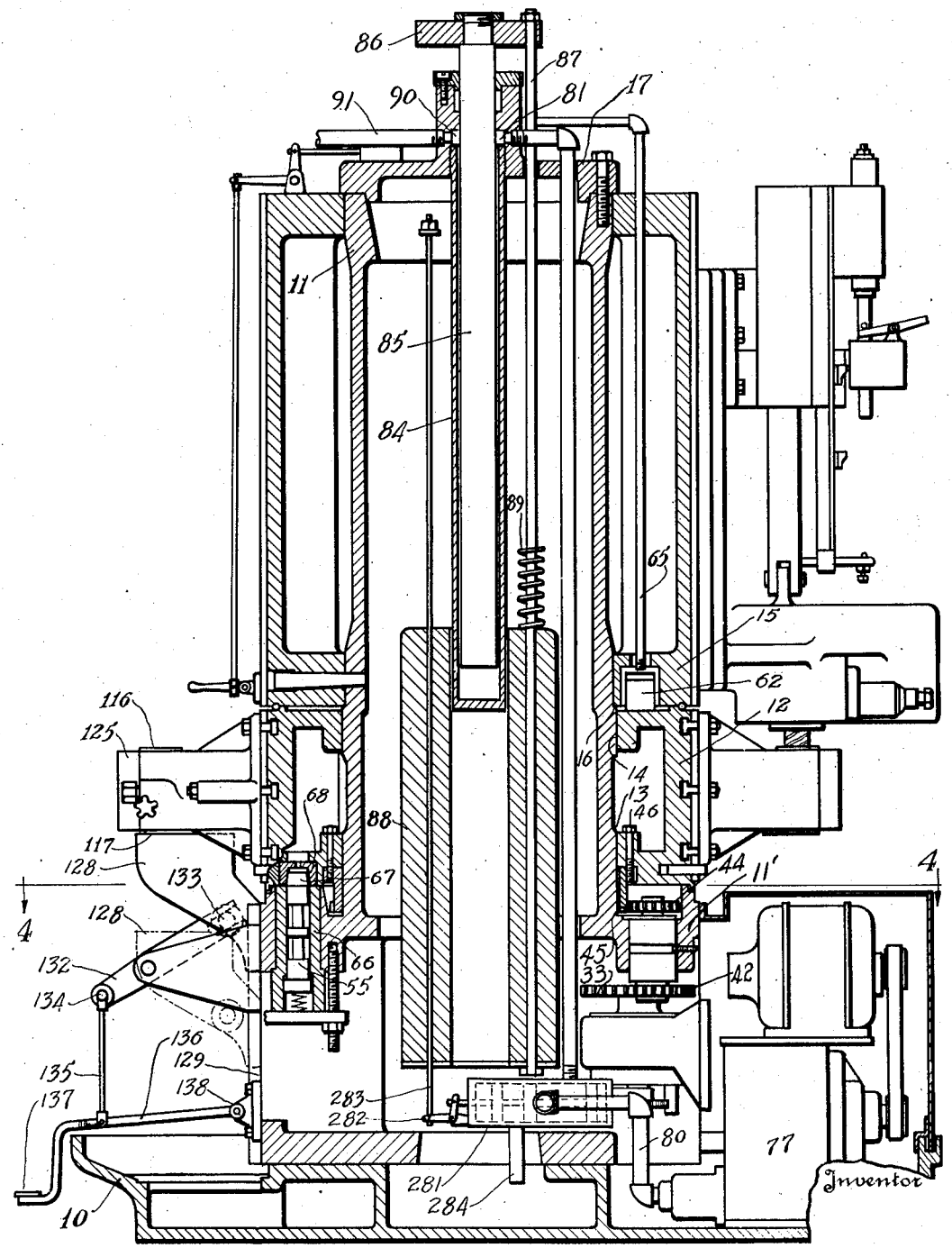
Figure 3 is a sectional elevation on the line 3—3 of Figure 2.

Referring to Figures 1 and 3 of the drawings the general features of the machine will first be indicated, the reference numeral 10 indicating the base portion of the machine, which is of rather circular form, having uprising from the center thereof a hollow or tubular column portion 11. The lower portion of this column is enlarged as at 11', shown in Figures 3 and 4, to provide on its upper face a supporting or bearing surface 12' for the turret or indexible head 12 and on its side faces a lower tool support. The turret is journaled at 13 and 14 on the column by being slipped down over the column from the top onto these machined surfaces. Above the indexible head there is mounted on the column a fixed head or upper tool support 15 which is assembled in a similar manner to the turret but fixedly supported on a shoulder 16 formed on the column adjacent to the top surface of the turret. The upper tool support 15 is secured in place by an overlapping cap member 17 bolted upon the top of the column. An hydraulic accumulator is supported in the hollow interior of the column for providing a constant source of pressure for the hydraulic actuation of the machine.

Figure 2:
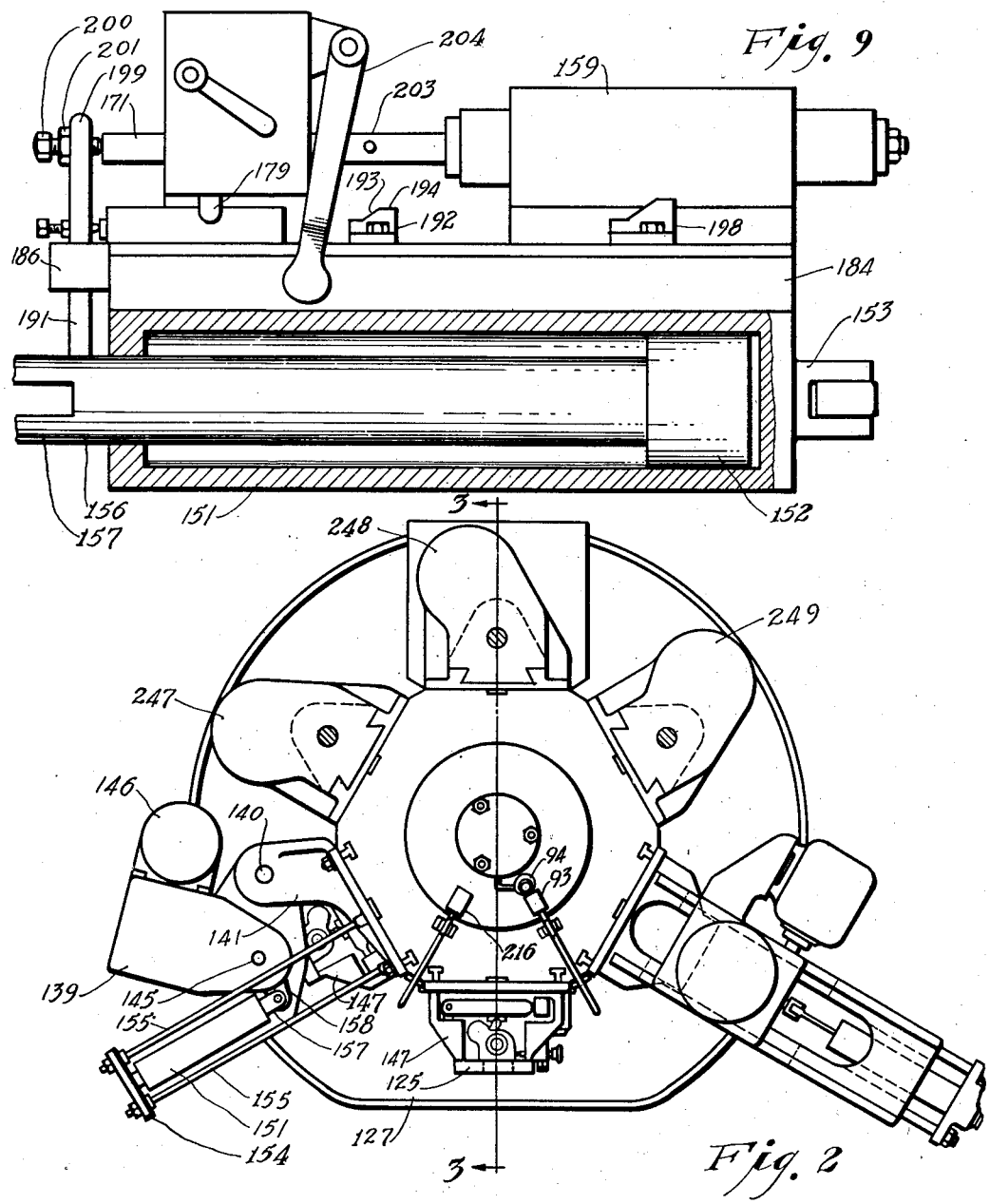
Figure 2 is a plan view of the machine shown in Figure 1 with some of the actuating cylinders removed.
Figure 4:
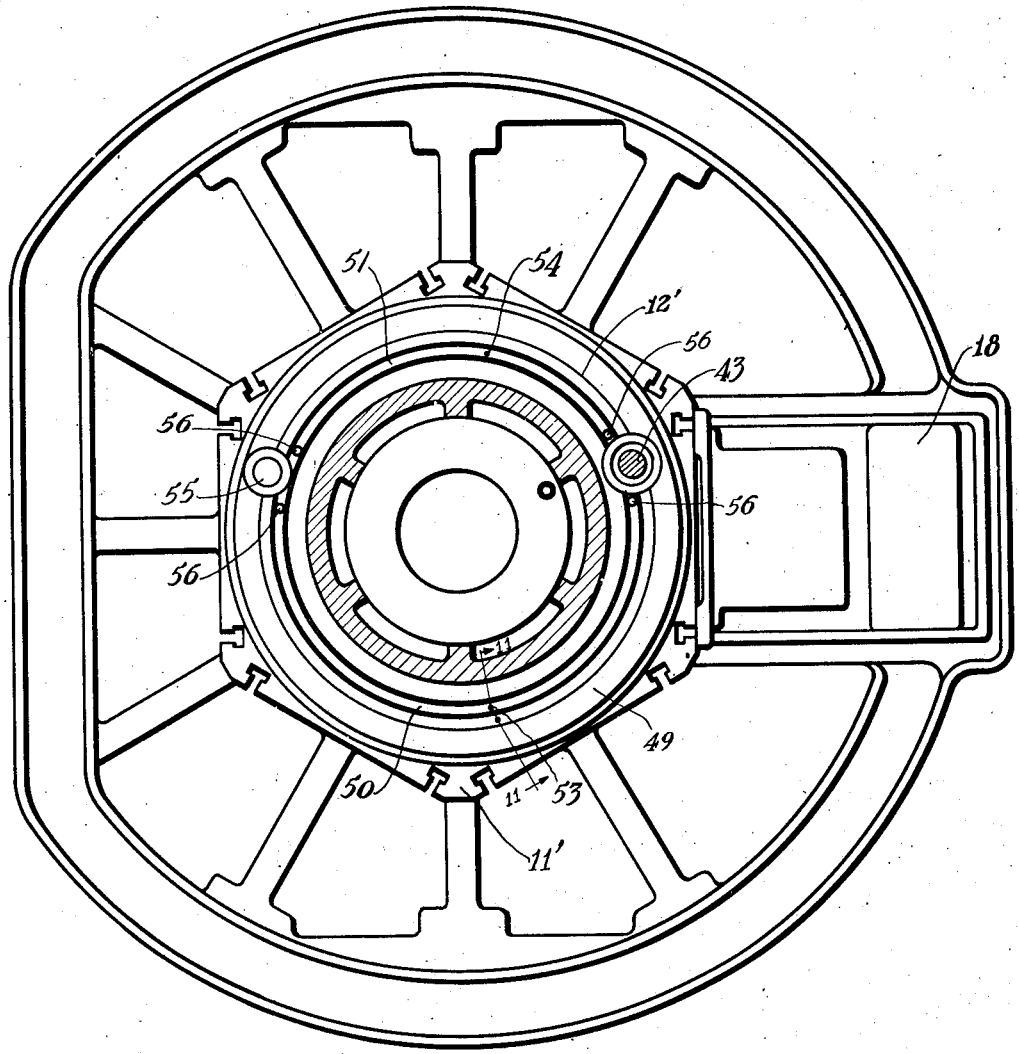
Figure 4 is a sectional view taken on the line 4—4 of Figure 3 showing more particularly the turret floating pressure grooves.

It will be noted from Figures 2 and 4 that the general outline of the assembled column of the machine is hexagonal in shape thereby providing six faces and it will be further noted from Figures 1 and 3 that these faces are substantially coplanar from the top to the bottom of the machine. In other words, the hexagonal faces of the lower tool support of the column are coplanar with the faces of the upper tool support 15 and the turret is indexible in such a manner that in each stop position its faces will lie in the same plane as the adjacent faces on the upper and lower tool supports. With this construction it is possible to mount tool heads upon the upper and lower faces in alignment with a work piece mounted on the intermediate face of the turret. Although the machine, as shown, has six faces it will of course, be understood that this is for illustrative purposes only and that a larger or smaller number of faces may be utilized without departing from this invention.

As shown in Figure 4 a prime mover housing 18 is illustrated as adjacent one of the lower hexagonal faces but, if so desired, this may be located in a more remote position if it is desired to increase the capacity of the machine by utilizing this face as a tool support. From the general description of the machine it will now be seen that it consists primarily of a stationary column portion having a plurality of upper and lower tool supporting faces arranged in corresponding pairs and an intermediate work carrying member in the form of a turret or indexible head upon the vertical faces of which work may be supported so that the peripheral face of the work, as well as the top and bottom faces, are exposed and accessible for the performance of tooling operations thereupon.

Turret indexing mechanism

Referring more particularly to Figures 5 and 6 the turret is indexed by a suitable hydraulic motor 19, in the present instance one of the vane type. In this type of motor a radial vane 20 is integrally secured to a rotatable shaft 21 for rotation in a cylindrical bore 21' which has a fixed sector portion 22 secured in place by suitable means, such as filister head screws 23, thereby dividing the cylinder, with the aid of the vane 20, into two chambers 24 and 25. Secured to the lower end of the shaft 21 is a radial finger 26 adapted to engage a stop member 27 which may be selectively located at various circumferential positions on the under side of the motor to determine the amount of rotation of the radial vane and thereby the extent of the indexing movement. Also, secured to this end of the shaft 21 is a gear 28 meshing with a pinion 29 formed on the end of the rotatable stop member 30 which is threaded in the lower cylinder head of the motor, and which projects from the top of the motor, as at 31, for engaging spaced lugs 32 depending from the under side of a gear 33 mounted for free rotation upon the upper end of the shaft 21. A ratchet member 34 is slidably keyed to the upper end of the shaft 21 and provided with teeth 35 for engagement with similar ratchet teeth 36 formed upon the hub of the gear 33 and held in engagement therewith by a spring 37 interposed between a shoulder 38 formed on the member 34 and a washer 39 mounted on the end of the shaft 21 and held in place by a nut 40.

It will now be evident that two stop members have been provided, to wit: the stop 27 and the stop 31. These stops are arranged to determine the amount of movement of the shaft 21 and vane 20, the stop 27 determining the extent of return movement, while the stop 31 determines the extent of the indexing movement. In other words, upon the admission of pressure to the chamber 25 the vane 20 will be caused to rotate in a clockwise direction or in the direction indicated by the arrow, which in turn will cause rotation of the ratchet 34 and, through the ratchet teeth 35, rotation of the gear 33 until a lug 32 engages the stop 31. Upon admission of pressure to chamber 24 the vane will return or rotate in a counter clockwise direction until the finger 26 engages the stop 27. During this return movement the previously mentioned gear 28 meshing with the pinion 29 will cause rotation of the member 30 in such a direction that the thread 41 formed thereon will cause withdrawal of the stop 31 from the path of the lug 32. This permits rotation of the gear 33 upon the re-admission of pressure to the chamber 25 whereupon as the vane rotates in a clockwise direction the member 30 will be rotated in a reverse direction to raise the stop 31 into engagement with the next succeeding lug. As shown in Figure 6, the stop 27 may be located in either one of two positions to effect indexing of the turret one station or two stations at a time. If indexing two stations the vane 20 is simply returned further until engagement of the finger 26 with the stop 27' and the memebr 30 is withdrawn further by this lengthened return movement so that upon termination of the indexing movement it will still be moved upward to the same position as illustrated in Figure 5.

The gear 33 meshes with a gear 42 secured to the end of the shaft 43 mounted in anti-friction bearings in a fixed part of the column and having a gear 44 secured to the upper end thereof operatively engaging the ring gear 45 secured to the under side of the turret, as by bolts 46, shown more particularly in Figure 3.

The indexing motor is provided with a port 47 through which pressure is admitted to the chamber 25 and a port 48 in the chamber 24 through which fluid is returned to reservoir during indexing of the turret. This port has a tapered opening at 48' whereby it will be closed gradually by the vane, thereby effecting a dashpot action to stop the movement of the vane without shock. At the completion of this movement, the direction of flow through these ports is reversed by valve means to be described later, the port 48 becoming a pressure port and the port 47 becoming an exhaust port whereupon the parts are returned to their starting position ready for the next cycle of operation.

Figure 11:
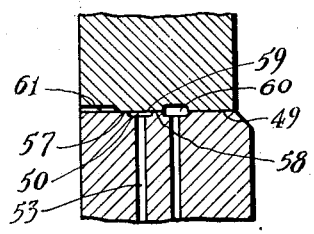
Figure 11 is a section on line 11—11 of Figure 4.

During movement of the turret means have been provided for reducing the amount of friction between the turret and its support and to this end the bearing surface 49 is provided with pressure grooves 50 and 51 which are adapted to be connected with a source of pressure through a channel 52 having outlets 53 and 54 respectively, in each groove. It will be noted from Figure 4 that these grooves are a continuation of one another forming a complete circle which is interrupted by the index driving shaft 43 and the locking bolt 55. To prevent the pressure from being dissipated at these points, stoppers, such as 56, are inserted in the ends of the grooves adjacent these parts. Upon the admission of pressure through the ports 53 and 54 a substantially complete ring of pressure is formed under the turret tending to raise the same from its bearing. As shown in Figure 11 annular surfaces 57 and 58 are formed in the bearing face adjacent to the grooves 50 and 51 and concentric therewith whereby upon the admission of pressure to the grooves the fluid tends to leak laterally between the surface 59 of the turret and the surfaces 57 and 58 into the annular grooves 60 and 61. It will thus be seen that a ring of pressure of substantial width is created between the turret and its support tending to lift the same and, due to the lubricating properties of the fluid reducing the frictional resistance against rotation, thereby facilitating the index movement.

At the completion of the indexing operation the turret is adapted to be clamped to firmly resist any lifting force caused by the reaction of the tools and for this purpose a plurality of hydraulically actuated clamping plungers, such as 62, are provided engaging an annular recess in the upper face of the turret. The plunger 62 is reciprocably mounted in a bore 64 forming an open ended cylinder to which pressure is conducted through a vertical channel 65. Upon the release of pressure in the channel 65 the plunger 62 is free to lift with the turret as during the application of pressure to the under side of the turret to float the same.

Figure 10:
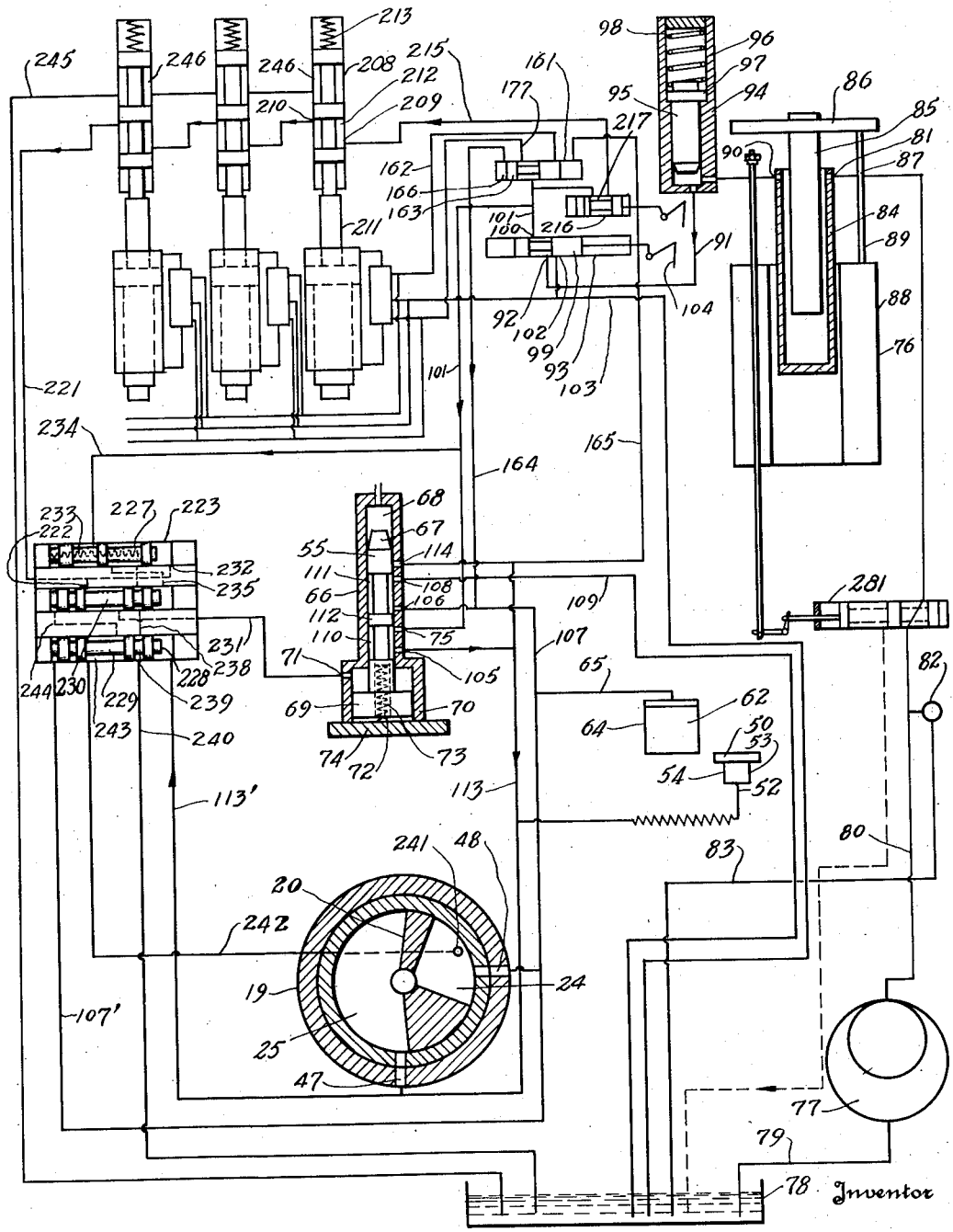
Figure 10 is a diagrammatic view of the hydraulic circuit for the machine.

As previously mentioned, a locking bolt 55 has been provided which serves to lock the turret against any rotational movement during the tooling operation. As shown in Figures 3 and 10 the locking bolt is reciprocably mounted in a bushing 66 secured in the base portion of the column and is provided with a tapered nose 67 for engaging any one of a plurality of bolt holes 68 formed in the under side of the turret. This locking bolt is adapted to be withdrawn by hydraulic means and returned by resilient means. One end of the locking bolt is provided with an enlarged head 69 forming a piston slidably mounted in an enlarged bore 70 of the bushing 66 forming a cylinder. A port 71 is provided in the cylinder for the admission of pressure to effect withdrawal of the locking bolt and upon the release of pressure the locking bolt is returned by means of a spring 72 mounted in an internal bore 73 of the locking bolt and engaging the cylinder head 74.

The intermediate portion of the locking bolt is in the form of a valve which controls the admission of pressure to the turret indexing, floating and clamping means. Pressure is supplied to the port 75 formed in the locking bolt valve bushing 66 from an accumulator, indicated generally by the reference numeral 76, which supplies pressure for the entire hydraulic operation of the machine. The accumulator is kept under pressure by a pump 77 which may be either of the constant delivery type or the variable delivery type. The pump takes fluid from a reservoir 78 through an in-take channel 79 and pumps it through a pipe 80 to the inlet 81 of the accumulator. A relief valve 82 is connected with pipe 80 and set for a predetermined pressure whereby that pressure will be maintained in the accumulator at all times but if exceeded the excess fluid will flow by means of channel 83 back to the reservoir.

The accumulator comprises a cylinder 84 which is threaded into the cap member 17 and depends into the hollow interior of the column. The upper end of the cylinder is closed by a packed joint in which is slidably mounted the hydraulic ram 85. Secured to the upper end of the ram is a spider 86 comprising a plurality of arms to the ends of which are secured a plurality of depending rods 87 which pass through a weight 88. The effect of the weight is to constantly urge the ram into the cylinder 84 to maintain the fluid therein at constant pressure during wide fluctuations in the volume thereof. To prevent undue shock during loading of the accumulator, springs, such as 89, may surround the rods 87 reducing the possibility of shock or bumping against the cap 17 as the weight rises to its uppermost position.

As a further precaution against overloading, a cut out valve 281 may be inserted in line 80 and operatively connected with the weight through a bell crank 282 and operating rod 283 which extends upward through the weight and provided with adjustable nuts on the top thereof. As the weight rises to its extreme upper position loading the accumulator almost to capacity, it contacts the nut thereby pulling upward on the rod 283 which, through the bell crank, shifts the valve and disconnects the incoming channel 80 from the accumulator and connects it to the return channel 284 leading to reservoir.

The cylinder 84 is provided with an outlet port 90 and a channel 91 connects this port with an inlet port 92 of the main stop valve 93. If so desired, a shock absorber 94 may be inserted in the line 91 to prevent hammering in the hydraulic lines due to sudden rises in pressure caused by various valve movements essential to the operation of the machine. This shock absorber may be of any suitable form, such as a spring pressed plunger 95 reciprocably mounted in a cylinder 96, the plunger having a shoulder 97 to limit its movement in one direction to such an amount that the inlet and outlet ports to the absorber are always connected but upon a sudden increase in pressure the plunger will rise against the action of the spring 98 permitting a volumetric increase in the fluid chamber and thereby obviating any hammering in the lines.

The main stop valve comprises a reciprocably mounted valve plunger 99 for connecting the inlet port 92 with the outlet port 100 which leads to the lock bolt valve through the channel 101 or with an outlet port 102 which connects with the return channel 103. The valve is adapted to be manually controlled through intervening linkage 103' by a lever 104 pivotally mounted on a fixed part of the column adjacent the loading station of the machine and within easy reach of the operator from his normal position at the machine. The channel 101 is connected to the previously mentioned pressure port 75 of the lock bolt valve cylinder. This cylinder is also provided with a port 105 which is connected to the port 47 of the indexing motor 19 by channel 113 having a branch 52 leading to the turret floating mechanism; a port 106 connected to the port 48 of the indexing motor through channel 107, this channel also supplying fluid pressure to a channel 65 leading to the turret clamping plunger 62; and a port 108 connected to the reservoir 78 through the channel 109. The valve plunger is provided with two annular grooves 110 and 111 separated by the spool portion 112.

The indexing operation is accomplished in the following manner: Upon the admission of pressure to cylinder 70 through port 71 in timed relation with the cycle of the machine, as explained hereafter, the locking bolt will be withdrawn against the urge of the spring 72. As a result of this movement the groove 110 of the valve will couple the ports 75 and 105 together and fluid will flow from the pressure line 101 to the port 47 of the motor 19 through channel 113 and simultaneously to branch channel 52 connected therewith. At the same time the groove 111 will couple together the ports 106 and 108 thereby connecting the port 48 of the index motor with the reservoir line 109 which will also relieve the pressure against the locking plunger 62. The indexing motor will thus start to rotate the turret while at the same time pressure will be admitted to the under side to raise or float the turret and since the pressure in the channel 65 has been relieved, the plunger 62 will offer no resistance to this movement. Upon completion of the indexing movement the pressure in the chamber 70 of the locking bolt will diminish and the bolt returned to a locking position by the spring 72. This will close port 105 and couple port 75 with port 106 thereby shutting off pressure to the motor port 47 and admitting pressure to motor port 48 causing a reverse rotation of the index motor. Upon completion of this movement pressure will build up in the channel 107 and thereby through channel 65 exert a clamping pressure on the plunger 62. Pressure from the channel 113 and its branch channel 52 will be relieved through port 114 which will be connected with the port 108 of the return line 109 through groove 111.

As heretofore mentioned the turret is provided with a plurality of faces and for the proper positioning of work thereon a suitable work fixture is secured to each face for similarly locating each work piece with respect to the tools. A better understanding of the cooperation between the tool heads and the work fixture will perhaps be had by referring to Figures 12 to 17 inclusive, wherein is shown for illustrative purposes a work piece 115 having a top face 116 and a bottom face 117 which are to be milled, a pair of opposed internal bosses 118 and 119 which are to be face milled, opposed apertures 120 and 121 which are to be roughed out as by end mills, shown in Figure 13, finished bored, as shown in Figure 14, and finish reamed, as shown in Figure 15, and which has a second pair of opposed internal bosses 122 and 123 which are to be face milled and an oil drain hole 124 which is to be drilled. A fixture for holding this work piece is of such construction that the work is clamped against a locating member 125 at the front of the fixture which has an aperture 126 therein through which the internal milling tools may pass and also openings in the top and bottom through which other cutter tools may be passed. A loading station 127, as shown in Figure 2, is provided at the machine where the operator may remove the finished work from each fixture as it arrives at the station and substitute a new work piece therefor. To facilitate this operation a loading table 128, as shown in Figure 3, is reciprocably mounted upon the lower face 129 between fixed brackets 130 and 131 in which is pivotally mounted an elevating lever 132 pivotally secured at its inner end 133 to the table and at its outer end 134 to a connecting link 135 which connects the elevating lever with the foot actuated operating lever 136 having a pedal 137. The operating lever is pivoted at 138 to a fixed part of the machine whereby upon the application of pressure to the outer end the elevating lever will cause the table 128 to rise and move a work piece placed thereon into the work fixture through the bottom thereof. While being held in this position by the table the work piece may be secured in the fixture and it will be noted, in such position that the faces 116 and 117 project a slight amount beyond the upper and lower faces of the fixture to permit finishing thereof by the milling tools without interference with the fixture itself.

Particular attention is invited to the fact that the machine in general and the work fixture in particular are of such construction that the work may be positioned so that its three sides are accessible for machining purposes. Although a work loading table has been illustrated it will, of course, be understood that lighter types of work may be inserted in and removed from their fixture manually, the table then merely serving as a shelf for holding a supply of work.

Tool head

In general each tool head is provided with an individual motor or prime mover for actuating the cutting tool thereof and movable bodily therewith, the tool and its motor being mounted on a head which is movable in a desired direction by hydraulic means for effecting stock removal. Although each tool head is composed of these essential elements they may be so arranged as to effect tool adjustment in any one of a plurality of directions, such as vertical down feed into the work or a vertical up feed into the work or a lateral horizontal feed into the work or the tools may be swung about a pivot for oscillation with respect to the work in certain types of operations. The specific mechanism in each tool head for rotating the tool may be of any suitable known arrangement to effect rotation of the tool at the desired speed rate, such as by direct connection to the motor spindle for high speed operation or through reduction gearing to effect lower speeds. The hydraulic mechanism for translating the tool is arranged in each case to effect movement of the tool toward the work in a desired direction at a rapid traverse rate which is subsequently reduced automatically as the tool nears the work to a feed rate to perform the tooling operation at the completion of which the tool is returned to its starting position at a quick traverse rate. Each of these hydraulic actuating mechanisms are interconnected in such manner that the indexing operation cannot take place until all of the tools have been returned to their starting position, the completion of the return movement of the last tool automatically setting into operation the next indexing movement.

As illustrative of the types of tool heads that may be utilized upon this machine reference may be had to Figures 1, 2 and 3 wherein are illustrated suitably actuated tool heads for carrying out the tooling operations previously described in connection with Figures 12 to 16 inclusive. As shown in Figures 1 and 2 a swinging head 139 is pivoted at 140 between brackets 141 and 142 attached to the upper and lower tool support respectively, for feeding a pair of milling cutters 143 and 144 journaled on an axis 145 for actuation by a prime mover 146 carried by the head 139 toward the work fixture 147 to carry out the operation illustrated in Figure 11 of face milling the surfaces 116 and 117 of the work piece. The head also carries an integral arm 148 in the end of which are journaled an opposed pair of milling cutters 149, (Figures 12 and 17) for face milling a pair of interior bosses 150. The head is adapted to be moved by hydraulic means, such as a cylinder 151, having a piston 152 reciprocably mounted therein. The cylinder is provided with a bifurcated end 153 by which it is pivotally mounted upon a cross bar 154 secured to the end of a pair of spaced parallel tension rods 155 projecting from and secured to the member 141. The piston rod 156 of the piston 152 has a forked end 157 engaging a lug 158 projecting from the head 139 and pivotally secured thereto whereby upon the admission of pressure to the left end of the cylinder (Figure 2) the head 139 will be oscillated and the piston and cylinder will be free to angularly adjust themselves during the oscillating movement.

A feed control value 159 (Figures 9 and 18) has been provided in conjunction with the cylinder 151 for automatically determining the rate and direction of movement of the head 139. The valve is provided with a plurality of ports, the port 160 being known as a rapid traverse port which is connected to a feed cut out valve 161 by channel 162, Figure 10. This valve is provided with a shiftable spool 163 adapted to be automatically shuttled under the control of the locking bolt control valve through channels 164 and 165. The channel 164 is connected to channel 107 whereby upon the admission of pressure to this channel to effect return of the indexing motor vane, pressure will also be admitted to chamber 166 of the cut out valve to shift the spool 163 to the right to connect the channel 162 with the main pressure line 101. Upon withdrawal of the locking bolt to the position shown in Figure 9, pressure will be admitted to the channel 113, as previously described, to effect an indexing movement and simultaneously therewith pressure will flow through the channel 165 to the right end of the cut out valve thereby shifting the spool 163 to the left and cutting off the feed control valve from the pressure source. This line 165 is also connected to the port 114 whereby upon return movement of the locking bolt which will effect interconnection of the ports 114 and 108 the fluid in the right end of the cylinder 161 may drain back to reservoir and permit shifting of the valve to the right.

The feed control valve 159 is provided with a port 167, known as the feed port, which receives pressure from the channel 162 through the branch line 168 having interposed therein a reducing valve 169. A third port 170 in the valve is connected to the reservoir 78 through channel 103. Reciprocably mounted in the valve 159 is the valve plunger 171 having spools 172, 173 and 174 formed thereon providing intermediate annular grooves 175 and 176. In the position of the parts shown in Figure 18 the valve is in a quick traverse forward position having been returned to such position by the admission of fluid pressure to the channel 177 upon movement of the valve spool 163 to the left which is effected simultaneously with the admission of pressure to the index motor to effect an indexing operation. The valve plunger 171 is returned against the compression of spring 178 and latched in that position by the detent 179 engaging an indent 180 formed in the end of the valve plunger 171, the detent being spring actuated to this position by a spring 181. It will be noted that fluid pressure is now free to flow from port 160 around the annular groove 175 to ports 182 and 183, the port 182 being connected to the left end of the cylinder, as viewed in Figure 18, while the port 183 is connected to the right end of the cylinder. Although fluid pressure is thus simultaneously connected to both ends of the cylinder, movement of the piston and piston rod follows due to the difference in pressure area between the opposite ends of the piston as the area on one side is reduced by the cross sectional area of the piston rod. Attention is invited to the fact, however, that upon movement of the valve to this position, movement of the piston and its attached tool head does not immediately follow but is determined by the shifting of the spool 163 to the right at the termination of the indexing movement at which time pressure to the channel 177 will be cut off and simultaneously admitted to the channel 162. Therefore, although the valve plunger 171 is in a position to permit quick traverse movement of the tool head no movement actually results until the indexing operation has been completed.

The cylinder 151 has secured to one side thereof or integral therewith a casting 184 in which is formed a dove-tail guideway 185 for reciprocably mounting a dog carrying slide 186 having a T-slot 187 formed in the upper surface thereof for receiving bolts 188 by which dogs are adjustably positioned and secured on the slide. This casting 184 also has a bracket 190 to which is secured the feed control valve cylinder 159 in operative relation to the slide 186 for dog actuation and control thereby. The slide 187 is operatively connected to the piston rod by means of a connecting pin 191 for movement therewith. It should, therefore, be apparent that upon the admission of fluid pressure to the cylinder 151 resulting in movement of piston 156 that the slide 186 will be simultaneously moved therewith. Attached to the slide 186 is a dog 192 having a beveled face 193 for engaging the end of the detent 179. The face 194 on the dog 192 determines the amount of inward movement of the detent 179 and in this instance is sufficient to move the detent out of engagement with the shoulder 180 thereby permitting the valve plunger 171 to be actuated by the spring 178 until a shoulder 195 formed on the valve plunger 171 engages the detent and stops its further movement. It will be recalled that the valve was in a position to effect quick traverse of the tool head and the dog 192 determines the length of this movement or, in other words, is adapted to change the rate of movement from a rapid traverse to a feed rate before the tool engages the work. From Figure 18 the spool 172 will now be in a position to close off the ports 160 and 182 while still permitting communication between the ports 167 and 183 permitting fluid flowing through the reducing valve 169 to continue the movement of the tool head at a feed rate. At the same time the annular groove 176 connects port 196 with the port 170 permitting fluid in the lower end of the cylinder to be returned to reservoir through the spring closed valve 197 which is held closed by sufficient pressure to maintain a predetermined back pressure on the feeding of the tool to prevent any possibility of the tool jumping ahead.

The feeding movement continues until a second dog 198, similar in form to the dog 192 but of sufficient height to move the detent plunger 179 sufficiently to effect its disengagement from the shoulder 195 thereby permitting the valve plunger 171 to be moved by its spring to its extreme outward position effecting a quick traverse return movement of the tool head. As a result of this movement the spool 172 will move sufficiently to disconnect the port 167 from port 183 and re-establish connection between the port 160 and port 182. The port 167 will be closed by the spool 182 but the port 183 will be connected by means of the annular groove 175 with the port 170 which leads to the reservoir. This will permit a free discharge of fluid from the upper end of the cylinder to reservoir with a minimum of back pressure. As the tool head is returning at a rapid traverse rate another dog 199 secured to the slide 186 and having an adjustable set screw 200 and lock nut 201 in the end thereof engages the end of the valve plunger 171 moving it longitudinally against the pressure of its spring 178 to a stop position or to the position shown in Figure 9. In this position of the parts the spool 172 will be in a position to close the ports 182 and 167 thereby locking the fluid in one end of the cylinder and preventing any flow from ports 167 or 160 to the port 183 thereby locking the fluid in the other end of the cylinder. The spool 173 will be moved sufficiently to close port 170 thereby preventing any possibility of leakage return to the reservoir from port 196. The spool 174 will be moved to a position opposite the channel 177 but it will be noted that the valve bore is slightly enlarged in diameter at this end of the valve, as shown at 202, whereby upon shifting of the valve spool 163 to the left effected by initiation of the indexing movement, as previously described, fluid will flow from channel 101 to channel 177 and by means of the enlarged portion 202 will find its way between the end of the spool 174 and the adjacent cylinder head. As the pressure builds up, valve plunger 171 will be moved to its extreme right position, as shown in Figure 18, and the detent 179 will be spring actuated into locking position with the shoulder 180 thereby re-setting the parts for another cycle of operation. A pin 203 is secured in the valve plunger 171 for engagement by the pivotally mounted lever 204 whereby the valve may be re-set manually for setting up and test purposes. Also, a pinion shaft 205 engaging a rack 206 formed in the member 179 is provided with a manual operating lever 207 whereby the detent 179 may be manually withdrawn for testing out the machine during set-up.

For the purpose of controlling or determining when each index movement will take place there is provided an index control valve, shown more particularly in Figures 7, 8 and 10, which in turn is controlled by pilot valves, one of which is connected to each tool head. The pilot valves are connected in series, as shown diagrammatically in Figure 10, whereby the flow of pressure to the index control valve cannot take place until all of the tool heads have been returned to their starting position. Each pilot valve comprises a cylinder 208 formed integrally with or separately attachable to the casting 184 secured to the cylinder 151. This valve has an inlet port 209 and an outlet port 210. A valve plunger 211 is provided with an annular groove 212 adapted to connect the port 209 with the port 210 upon longitudinal movement against the pressure of spring 213 by the returning tool head through the medium of dog 214 secured to the slide 186. It will be apparent by reference to Figure 10 that upon downward movement of the tool head these ports will be disconnected by longitudinal movement of the valve spool caused by the spring 213.

Pressure is supplied to the pilot valves through a channel 215 which is connected to the pressure line 101 through an index cut out valve 216. This is a simple spool type valve having an annular groove 217 adapted upon movement to the left to effect connection between the channels 101 and 215 and upon movement to the right to disconnect the flow to channel 215. This valve is mounted upon the top of the column of the machine and provided with an operating bell crank 218 connected to an operating lever 219 by means of a connecting link 220 whereby the valve may be controlled from the operator's normal position at the loading station. It should now be apparent that if the pressure is disconnected from the channel 215 by means of this valve that the indexing movement will fail to take place upon return of all the tool heads to their starting position since no pressure will be applied to the indexing control valves to initiate the indexing movement.

By reference more particularly to Figures 7, 8 and 10, pressure will flow to the pilot valves at the completion of return movement of all the tool heads through channel 221 to port 222 formed in the index control valve body 223. This body has three valve cylinder bores 224, 225 and 226 formed therein in which are reciprocably mounted the valve plungers 227, 228 and 229 respectively. The valve spool 228 is in the position shown upon the admission of pressure to the channel 221 and it will be apparent that upon the completion of the hydraulic circuit by the return of all the tool heads that pressure will flow through the annular groove 230 of this valve to the channel 231 leading to the port 71 of the lock bolt thereby effecting its withdrawal, as previously explained, and thereby initiating an index movement. The pressure in channel 221 will also flow to the port 232 shifting the valve plunger 227 to the left, as viewed in Figures 7 and 10. This valve was normally in a right hand position due to the pressure of the spring 233 in which position it connected the pressure line 234, which is a branch from the main pressure line 101, with the right hand end of cylinder 225 by means of the short interconnecting channel 235 thereby shifting and maintaining the valve spool 228 in a left hand position ready to connect the lock bolt cylinder with pressure at the completion of the return movement of the tool heads.

The shifting of the valve spool 227 to the left will disconnect the pressure line 234 from the right end of cylinder 225 and interconnect the channel 235 with the channel 236 from which fluid will flow around the annular groove 237 formed in valve spool 228 and channel 238 to the valve spool 229 which will be at the moment in a right hand position but which will be shifted immediately upon the pressure in channel 113 flowing to in-take port 47 of the index motor whereby it will continue through channel 113' to the right end of cylinder 226 moving the spool 229 to the left thereby registering an annular groove 239 formed therein with the in-take of channel 238 and the outlet to the reservoir line 240. By this series of connections it will be seen that the pressure in the right end of the valve cylinder 225 will be relieved by the return of fluid to reservoir. This leaves the valve spool 228 free to be shifted to the right when, during rotation of the indexing gear, the vane passes over and uncovers the port 241 thereby subjecting the connected line 242 to pressure which will flow by means of annular groove 243 to channel 244 thence to the left end of cylinder 225 shifting the valve spool therein to the right. The effect of this is to disconnect the channel 221 from the channel 231 and interconnect the latter with the reservoir line 240 permitting the spring 72 of the lock bolt to come into action and return the locking bolt to locking position. The effect of this return movement of the locking bolt has previously been described, it being important to note at this time that pressure will flow to the port 48 causing return oscillation of the indexing motor vane and the port 241 will be connected with pressure from the port 48 thereby maintaining the valve 228 in a right hand shifted position momentarily. The pressure flowing in the channel 107 to the port 48 will continue through channel 107' to the left end of cylinder 226 and since the channel 113' will now be connected to reservoir the valve spool will be shifted to the right by the admission of pressure to the left end. The effect of this is to disconnect the channel 238 from the reservoir line 240. It will be recalled that upon the admission of pressure to the channel 107 to effect return oscillation of the index vane that pressure was caused to flow in channel 164 shuttling the valve 163 to the right which thereby connected the channel 101 with the pressure line 162 leading to the tool head feed cylinders whereupon the tool heads will move down and the pilot valves will close under spring pressure, as previously described.

Attention is invited to the fact that since the port 232 in the right hand end of cylinder 224 is connected to the channel 221 and since this channel will be connected to the reservoir line 245 by means of the annular grooves 246 of the pilot valves it thereby relieves the pressure in the right end of cylinder 224 permitting the spring 233 to come into action and shift the valve spool 227 to the right. This will re-establish pressure connection between the channel 234 and the right end of the cylinder 225 thereby shifting the valve spool therein to the left and re-establishing connection between the channel 221 and channel 231 through the annular groove 228 and position the parts ready for the next indexing movement.

The subsequent tooling operations illustrated in Figures 13, 14 and 15 may be carried out by means of vertically reciprocating tool heads illustrated generally in Figure 2 by numerals 247, 248 and 249. As shown in Figure 3 these three heads may be vertically reciprocated by means of a tool cylinder, similar to the one just described, only mounted in a vertical position. In performing the last operation illustrated in Figure 16, a reciprocably mounted tool head 250 may be provided for performing the internal milling operation while a vertically reciprocably mounted spindle 251 may be provided for the drilling operation. This spindle is mounted in a head 252 illustrated more particularly in Figure 19. The spindle 251 is journaled in a slidable quill 253 which is in the form of a piston slidably mounted in a bushing 254 threaded in the head 252 and forming a cylinder head between which and shoulder 255 on the quill is formed a chamber 256 adapted to receive pressure from port 183 of a control valve to cause outward movement of the quill. A gear 257 secured to the rear end of the spindle meshes with an elongated gear 258 journaled in the head for maintaining driving connection throughout the range of movement of the quill. The gear 259 has an enlarged gear 260 secured to the lower end thereof which meshes with a gear 261 secured to a parallel shaft 262 having a worm gear 263 on the opposite end driven from worm 264 on the end of the motor shaft 265. Return movement of the quill is effected by an auxiliary piston 266 reciprocably mounted in parallel relation to the quill and having a bracket 267 engaging a shoulder 268 formed on the quill for returning the quill and thereby the tool to a non-cutting position. The piston 266 is reciprocably mounted in a cylinder 269 which is adapted to be connected to ports 182 and 196 of a control valve. Formed on the lower end of the plunger 266 is a rack 270 engaging a pinion 271 adapted to engage a rack formed on a reciprocable dog carrying slide, similar to slide 186. Means have been provided for limiting the outward movement of the plunger and, therefore, the depth of cut of the tool and comprises a stop member 272 having a shank 273 by which it is carried and an adjustable member 274 having a threaded bore 275 for receiving an adjusting bolt 276 which is journaled in a member 277 fixed to the tool head. The adjusting screw 276 is provided with a suitable head 278 upon which is formed a beveled face 279 carrying suitable indicia 280 for indicating the amount of the adjustment effected. The tool head is always returned to the same position while the member 272 determines the length of its movement in an outward direction.

The operation of the machine is as follows: The pump is started to load up the accumulator. If the accumulator becomes loaded to capacity before the pressure is drawn upon, the pump will be short circuited to reservoir by the valve 281 actuated by the rising weight 88. The main control valve 93 is opened to the position shown in Figure 10 by the lever 104 to start the machine cycle. The tool heads may be assumed to be in a return position and the work fixture loaded. Fluid pressure will then flow through channel 101, valve 216, channel 215 and pilot valves 209 to the index control valve 223 which will be in a position to permit the pressure to flow around groove 230 of plunger 228, channel 231, to the port 71 of the lock bolt cylinder 70. This will cause the port 71 to be under pressure, causing withdrawal of the lock bolt.

The fluid flow in channel 101 will also cause port 75 of the lock bolt cylinder to be under pressure at the time that the lock bolt is withdrawn, which withdrawal will couple port 75 to the port 105 causing pressure to flow in line 113 to the port 47 of the index motor, and also to channel 52 leading to the pressure grooves. Simultaneously the withdrawal of the lock bolt will couple port 106 in the lock bolt cylinder, to which the line 107 is connected, with port 108 to which the return line 109 is connected, thereby permitting fluid to exhaust from chamber 24 of the motor and from the cylinder 64 of the turret clamp through channel 107 to reservoir. The withdrawal of the lock bolt thus automatically admits pressure to the index motor to cause rotation of the vane in a clockwise rotation to effect indexing of the turret, withdrawal of the fluid pressure from the turret clamping means and the admission of fluid pressure to the turret floating means. It may be noted that at this point the pressure flow in channel 113 to the port 47 of the index motor also continues through channel 113' to the index valves, thereby shifting plunger 229 to the left, which resets the same for subsequent operation to be explained hereinafter.

As the index motor completes its movement, it connects channel 242 with the pressure in chamber 25 which pressure flows through groove 243 of the previously shifted plunger 229 and thru channel 244 to the left end of the cylinder containing plunger 228 thereby shifting the plunger to the right. This automatically cuts off the flow of pressure from channel 221 to the port 71 of the lock bolt cylinder and connects that port by means of channel 231 and groove 230 in plunger 228 to the return line 240 thereby permitting the fluid above the piston 69 to exhaust to reservoir. The spring 72 then comes into action to return the lock bolt. This return movement shifts the valve associated with the lock bolt to a position coupling the pressure port 75 to channel 107 to effect clamping of the turret by plunger 62 and reverse rotation of the index motor vane 20. Simultaneously the port 108 is disconnected from the port 106 and connected with the port 114 which permits fluid in the right hand end of valve 161 to discharge through channels 165 and 109 to reservoir. This allows the pressure flowing in channel 107 to be coupled through channel 164 to the left end of valve 161 shifting the plunger 163 thereof to the right, coupling channel 101 to channel 162. The channel 162 is connected in parallel with the feed control valves of the various tool heads as previously explained which are now started in operation to execute their particular cycle of movement and return to starting position. It will be seen that the return of the lock bolt to locking position automatically starts the tool heads on their next cycle of movement.

As soon as the first tool head starts to move down, the pressure in the channel 221 is cut off by its pilot valve and after sufficient movement of the pilot valve this channel 221 is connected to the return line 245 which relieves the pressure in the right hand end of cylinder 224, permitting the spring 233 to shift the plunger 227 to the right. This connects channel 234 which is a branch line of channel 101, and normally under pressure by means of channel 235 with the right hand end of cylinder 225, shifting the plunger 228 to the left and resetting the same for the next indexing movement. After the tooling operations have been completed and all of the tool heads have returned to starting position, the pilot valves will again couple channel 215 to channel 221 and the index operation will be repeated.

From the foregoing description it should now be apparent that a machine tool of the station type has been provided which is capable of supporting work in an improved manner with relation to processing tools to permit the performance of tooling operations in a greater number of planes during a single set-up of the work than heretofore possible in this type of machine. It will also be noted that an improved hydraulically actuated machine tool has been provided having multiple tools, each susceptible of its own independent cycle of movement, yet all interlocked in such manner as to insure that the indexing of the work support does not take place until all of the tools have been returned to their starting position. The hydraulic operation and control makes possible a smooth running machine capable of high production and having a small number of levers thereby simplifying its control to the extent that practically inexperienced attendants may operate the machine satisfactorily.

We claim:—

1. A machine tool comprising a column, a plurality of pairs of upper and lower coplanar tool receiving surfaces on the column forming stations, tool heads mounted on each of said surfaces and movable relatively thereto, a spindle in each tool head, individual prime movers for rotating the spindles mounted on each tool head and movable therewith, a work support journaled on the column intermediate the tool receiving surfaces, means to feed the tool heads toward and from the work support and means to index the work support to position the work successively at each station for operation thereon by the tools located at each station and mechanism connecting said means for effecting alternate actuation thereof.

2. A machine tool comprising a column, a plurality of pairs of upper and lower tool receiving surfaces, tool heads mounted on each of said surfaces for relative movement thereto, each tool head including a rotatable spindle and a prime mover for actuation thereof, a work support rotatably mounted intermediate the upper and lower tool receiving surfaces, means to secure a work piece to the work support, means to index the work support to successively position the work at each station, and hydraulic means for effecting relative movement between the tools and work after each indexing movement.

3. A machine tool comprising a column, a plurality of pairs of upper and lower tool receiving surfaces on the column forming stations, a turret rotatably mounted intermediate said surfaces for intermittent movement from station to station, means on the turret for supporting work with three sides exposed for tooling operations, and a plurality of tool heads mounted on said surfaces respectively movable in horizontal and vertical planes and relative to the exposed sides of the work to effect a predetermined series of tooling operations on the work in a plurality of different planes in one revolution of the turret.

4. A machine tool having a vertical column, a journal formed on the periphery of the column, a turret having an internal bore rotatably mounted on said journal, a plurality of vertical work receiving faces formed on the turret, a tool receiving face formed on the column above and below the turret, tool heads mounted thereon for movement relative thereto, each tool head comprising a rotatable spindle and a prime mover therefor, means to secure a plurality of similar work pieces to each face of the turret, means to index the turret to successively present each of said work pieces to the opposed tools, and hydraulic means for effecting a feeding movement between the tool and the work.

5. A machine tool comprising a column, a plurality of pairs of upper and lower coplanar tool receiving surfaces formed thereon, an intermediate indexible turret having a similar number of vertical work receiving surfaces, each surface on the turret being coplanar with an adjacent upper and lower tool receiving surface, tool heads mounted on the upper and lower surfaces for movement relative to an intervening work piece, means to effect said movement, means to index the turret to present a new work piece to each pair of opposed tools and mechanism inter-connecting said means to effect alternate actuation thereof.

6. A machine tool comprising a column, a plurality of pairs of upper and lower coplanar tool receiving surfaces formed thereon, an intermediate indexible turret having a similar number of vertical work receiving surfaces, each surface on the turret being coplanar with an adjacent upper and lower tool receiving surface, tool heads mounted on each of said tool receiving surfaces comprising a rotatable spindle, a prime mover for actuation thereof, means for securing similar work pieces to each of the turret faces, means to index the turret to present a new work piece to each pair of opposed tools, and hydraulic actuating means for simultaneously feeding all of said tools into the work.

7. A machine tool comprising a column, a work supporting member rotatably mounted on the column, a plurality of tool heads mounted on the column for movement relative to said work table, hydraulic means for indexing said turret relative to the tool heads, hydraulic actuated means for feeding the tools relative to the work, and valve means operable by each of said hydraulic actuated means to terminate movement of one and initiate movement of the other.

8. A machine tool having a column, a work supporting turret journaled on the column, a plurality of tool heads spaced about the column forming stations, hydraulic actuated means for indexing the turret, a source of pressure therefor, means to move the tool heads toward and from the work after each indexing movement, and a pilot valve coupled with each tool head and adapted to be opened upon the return of its respective tool head, said pilot valves being connected in series between the source of pressure and the indexing mechanism, whereby the completion of the return movement of all the tool heads will couple the indexing mechanism with the source of pressure to index the turret.

9. A milling machine comprising a column, a vertical and horizontal bearing surface formed on the column, a turret journaled and supported on said bearing surfaces, a plurality of tool heads mounted on the column forming stations, hydraulic means for indexing the turret from station to station, and means to float the turret during the indexing operation including an annular pressure groove formed on the horizontal bearing surface of the column, and means to admit pressure to said groove simultaneously with the admission of pressure to effect said indexing movement.

10. A machine tool comprising a column, horizontal and vertical bearing surfaces on said column, an indexible turret mounted on said bearing surfaces, a plurality of tools spaced about said column forming stations, hydraulic means for indexing said turret from station to station, an hydraulically actuated clamp for the turret, and means to release the pressure on said clamp simultaneously with the admission of pressure to the indexing mechanism.

11. A machine tool comprising a column, a turret journaled on said column having a plurality of work receiving faces, a plurality of tool receiving faces formed on the column in coplanar relation to the work receiving surfaces, an hydraulically actuated locking bolt for securing the parts in coplanar relation, an hydraulically actuated clamp for securing the turret to the column, means to withdraw the locking bolt, means actuated by the bolt while in a retracted position to effect unclamping of the turret and indexing thereof, and means to effect reclamping of the turret upon return of the bolt.

12. A machine tool having a column, a plurality of tool heads spaced about said column forming stations, a work holding turret for indexing work from station to station, hydraulic actuated means for feeding the tool heads relative to the work, a lock bolt for securing the turret during said feeding movement, means actuated by the return of the tool heads to effect withdrawal of the locking bolt to permit indexing of the turret, and means effective at the completion of the indexing movement to return the lock bolt, said return movement being effective to initiate the next cycle of operations of the tool heads.

13. A machine tool comprising a column, a plurality of hydraulically actuated tools spaced about said column forming stations, an hydraulically actuated turret journaled on said column for moving work from station to station, said tools and turret being alternately actuable in successive automatic cycles, a source of pressure, a main control valve for coupling pressure to the hydraulically actuated parts, and an auxiliary cut-out valve to disconnect pressure from the turret during operation of the machine.

14. A machine tool comprising a column, an indexible turret journaled thereon, indexing mechanism therefor, a plurality of hydraulically actuated tool heads mounted on the column for movement relative to said turret, independent rate and direction control means for each tool head, a source of pressure, a shuttle valve for connecting the tool head control means in parallel with the source of pressure for effecting simultaneous actuation of the tool heads and for disconnecting the same, and means controlled by the indexing mechanism for determining the position of the shuttle valve.

15. A machine tool having a support, an indexible turret journaled thereon, means for indexing said turret including an hydraulically oscillated motor, final drive gearing connected to the turret, ratchet mechanism interposed between the motor and gearing for imparting unidirectional movement to the turret, and stops for determining the amount of oscillating movement of the motor, one of said stops being automatically positionable to prevent overrun of the turret.

16. A machine tool of the class described including an indexible turret, a reciprocable lock bolt for said turret, an hydraulically actuated vane motor for effecting indexing thereof, unidirectional motion transmitting means between the motor and turret, a source of pressure, a valve coupled with the lock bolt for movement therewith, means for coupling pressure to the lock bolt to cause its withdrawal and thereby effect indexing of the table, and means controlled by the motor on its index stroke to effect return of the lock bolt thereby reversing the flow to the motor to effect its return.

17. A machine tool having a support, an index table on the support, means to effect indexing thereof including an hydraulically actuated motor having a cylindrical bore, an oscillatable vane therein, a fixed partition in the bore, means to admit pressure between the vane and one side of said partition to effect indexing of the turret, and an exhaust port between the vane and the other side of said partition, said exhaust port being adaptable for gradual closing to uniformly reduce the momentum of the table at the termination of the index stroke.

18. A machine tool having a vertical hollow column, a journal formed on the periphery of the column, a turret having an internal bore rotatably mounted on said journal, hydraulically actuated means for effecting indexing of the turret and a source of fluid pressure for said means, including an accumulator mounted within the column, a pump for delivering fluid under pressure to said accumulator, and valve means for connecting the accumulator to said hydraulically actuated means.

19. A machine tool having a vertical hollow column, a journal formed on the periphery of the column, a turret having an internal bore rotatably mounted on said journal, hydraulically actuated means for effecting indexing of the turret, a source of fluid pressure for said means, including an accumulator mounted within the column, a pump for delivering fluid under pressure to said accumulator, valve means for connecting the accumulator to said hydraulically actuated means, said accumulator including a vertical weighted plunger, and means controlled by the weight upon elevation thereof to a position corresponding to full load of the accumulator to automatically disconnect the pump from the accumulator.

20. A machine tool having in combination a column, a turret rotatably mounted on the column, means to index the turret from station to station including an hydraulic motor, ratchet drive mechanism including a final gear for imparting unidirectional movement to the turret, a plurality of abutments on the final drive gear corresponding to the number of stations, a reciprocable disappearing stop, means connecting the stop to the motor to effect withdrawal of the stop during return movement of the motor to permit passage of said abutments and to effect projection of the stop into the path of the next abutment during rotation of the turret to limit its movement.

21. A machine tool having a support, an indexible turret journaled on the support, means for indexing the turret one station or two stations at a time including an hydraulically oscillated motor, a final drive gear connected to the turret, ratchet mechanism interposed between the motor and gear for imparting unidirectional movement to the turret, a plurality of abutments formed on the final drive gear and corresponding in number to the total number of stations of the turret, a disappearing stop operatively connected to the motor for retraction thereby during return movement of the motor and for projection by the motor into the path of one of said abutments during rotation of the turret, adjustable stop means to control the return movement of the turret and thereby determine the number of stations the turret is to be indexed during the forward movement of the motor, and means to cause the disappearing stop to be withdrawn twice as much for two station indexing as for one station indexing whereby the final return position will be the same for either type of indexing.

22. A milling machine comprising a column, a vertical and horizontal annular bearing surface formed on the column, a turret journaled and supported on said bearing surfaces, a plurality of tool heads mounted on the column forming stations, hydraulically actuated means for indexing the turret from station to station, and means to float the turret during the indexing operation including an annular pressure groove formed on the horizontal bearing surface, a concentric exhaust groove adjacent said pressure groove forming an intermediate bearing surface, and means to admit fluid to the pressure groove upon initiation of the indexing movements to cause elevation of the turret and formation of a lubricating film between said intermediate bearing surface and the turret, and a return channel connected to the exhaust groove whereby the escaping fluid may be returned to reservoir.

23. A machine tool having a vertical column, a journal formed in the periphery of the column, a turret having an internal bore rotatably mounted on said journal, a plurality of work receiving faces formed on the turret, a plurality of cutting tools supported by the column for relative movement with respect to the turret, hydraulically actuated means for initiating movement of all the tools simultaneously, adjustable means for determining the length of cutting stroke and the rate of feed of each of said tools, means to index the turret to successively present the work pieces carried thereby to the various tools, and means to prevent indexing of the turret until all of said tools have completed their cutting stroke.

24. A machine tool comprising a column, a plurality of pairs of upper and lower coplanar tool receiving surfaces formed thereon, a turret journaled on the column intermediate said pairs of surfaces, a plurality of work receiving surfaces formed on the turret in coplanar relation to the adjacent upper and lower tool receiving surfaces whereby work mounted thereon will have an exposed side, a plurality of cutting means supported by said tool receiving surfaces, one of said cutting means including a tool carrier pivotally supported at one end on said upper tool receiving surface and at the other end on one of said lower tool receiving surfaces, and hydraulically actuated means for moving said carrier toward and from the work.

LOUIS H. BLOOD.
CHARLES W. GOODRICH.